United States Patent [19]

Etchell

[11] Patent Number: 4,793,584
[45] Date of Patent: Dec. 27, 1988

[54] MODULAR PRESS FRAME AND STACKING PEDESTAL

[75] Inventor: Gordon Etchell, Downers Grove, Ill.

[73] Assignee: Pathfinder Graphic Associates Inc., Justice, Ill.

[21] Appl. No.: 61,675

[22] Filed: Jun. 10, 1987

[51] Int. Cl.⁴ ............................................. F16M 13/00
[52] U.S. Cl. ..................... 248/639; 211/194; 242/58; 248/672; 248/676
[58] Field of Search ............... 248/676, 677, 672, 673, 248/675, 637, 639; 211/194; 242/58, 58.1; 220/23.6; 206/503; 108/53.5

[56] References Cited

U.S. PATENT DOCUMENTS

| Re. 21,319 | 1/1940 | Tornberg | 242/58.1 X |
|---|---|---|---|
| 1,950,738 | 3/1934 | Mills | 242/58 |
| 2,524,955 | 10/1950 | Borzell et al. | 248/676 X |
| 2,962,167 | 11/1960 | Sturey et al. | 211/194 X |
| 3,053,558 | 9/1962 | Challas, Jr. et al. | 108/53.5 |
| 3,518,728 | 7/1970 | Phillips | 220/23.6 X |
| 4,609,975 | 9/1986 | Badolato et al. | 211/194 X |

FOREIGN PATENT DOCUMENTS

| 155192 | 2/1954 | Australia | 248/637 |
|---|---|---|---|
| 233107 | 2/1986 | Fed. Rep. of Germany | 206/503 |

*Primary Examiner*—Ramon S. Britts
*Assistant Examiner*—David L. Talbott

[57] ABSTRACT

A modular constructed supporting frame having a specific constructional shape affording interchangeability, such that the frame may be converted to a base unit, stacking unit, or a floor line unit, adapted to be combined with a modular rollstand frame into a floor unit. The modular frame includes a cavity cast pedestal, providing stacking convenience between modular frames while permitting internal access for repairing or replacement of operating units supported by the frame.

7 Claims, 3 Drawing Sheets

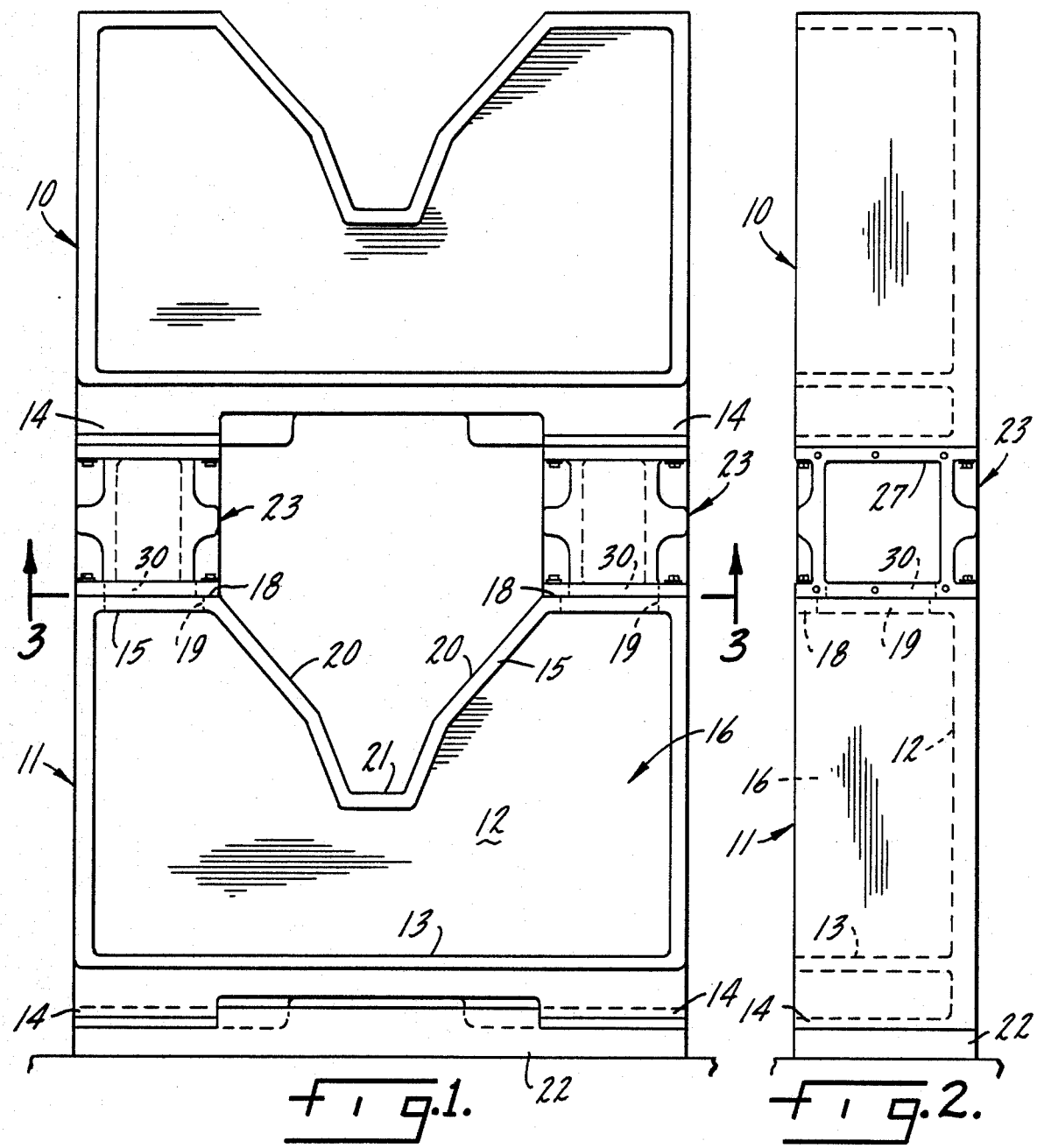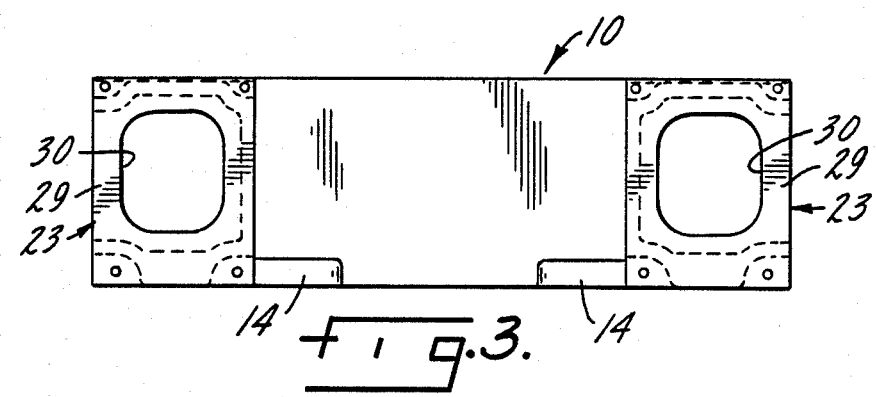

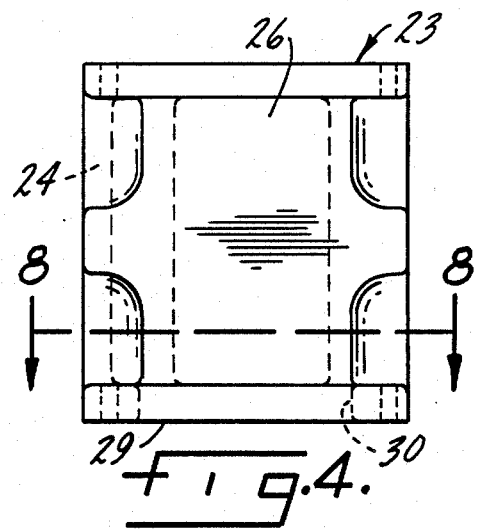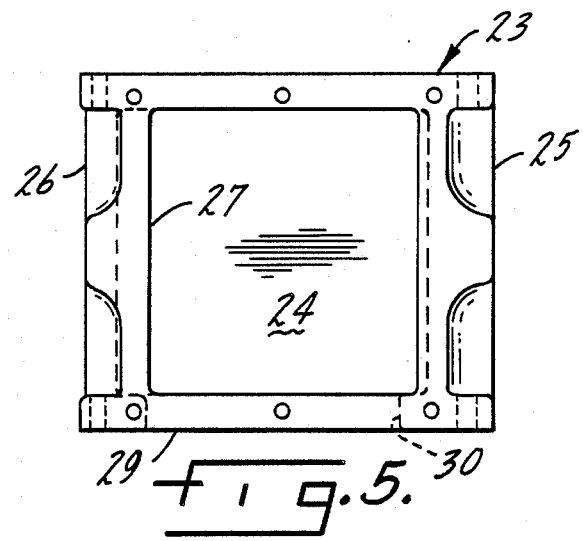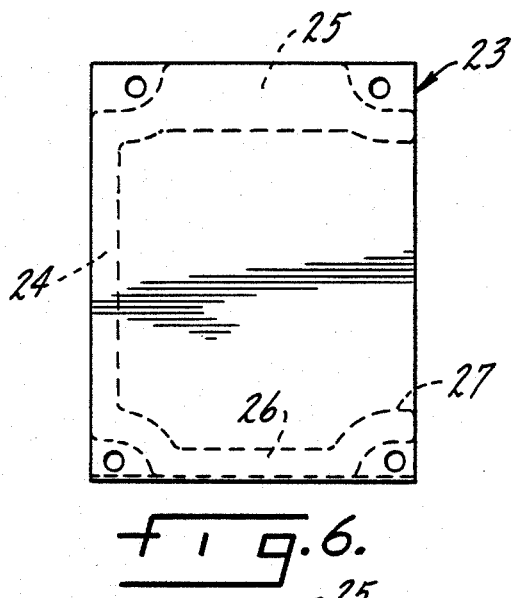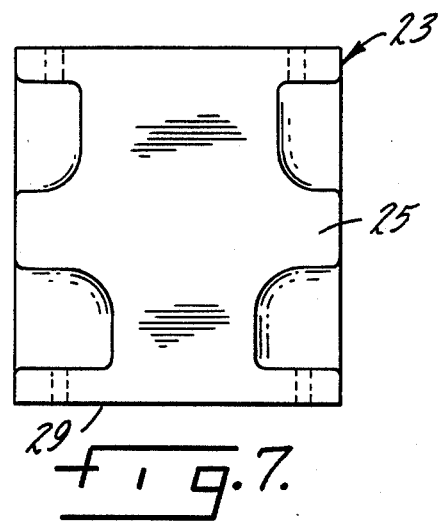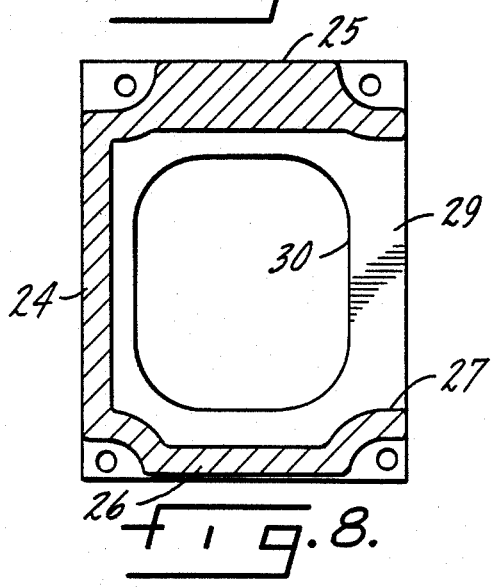

MODULAR PRESS FRAME AND STACKING PEDESTAL

BACKGROUND OF THE INVENTION

Printing systems have evolved into a continuous process requiring multiple press units and, therefore, necessitating the ability to combine the press units either in-line or stacked. To date, the method employed to obtain the continuous printing process required the designing and manufacturing of separate units for adaptation to each other.

The present invention is directed to a modular support frame having a specific constructional shape allowing for interchangeability. A pedestal provides stackable supports for the frames as well as to a base unit singularly or in a stacked condition.

SUMMARY OF THE INVENTION

The present invention is erected to a standardized modular constructed support frame providing means for adaptation and/or conversion to combine in-line or stackable capabilities of such frames.

An object of the present invention is to provide a modular support pedestal employed between the stackable units, not only to provide solid connection therebetween, but to provide internal access to the stacked units for repair and replacement of worn operating mechanisms supported by such frames.

Yet another object of this invention is to provide a modular press frame that is economical in manufacture and highly efficient in use.

Other objects will appear hereinafter.

BRIEF DESCRIPTION OF THE DRAWINGS

The invention will be best understood by reference to the accompanying drawings which illustrate the preferred form of embodiment by which the stated objects of the invention are achieved and in which:

FIG. 1 is a front elevational view of stacked modular units;

FIG. 2 is a side elevational view of the stacked modular units;

FIG. 3 is a sectional detailed view taken on line 3—3 of FIG. 1;

FIG. 4 is a front elevational view of the stacking pedestal of this invention;

FIG. 5 is a side elevational view of the stacking pedestal;

FIG. 6 is a top plan view of the stacking pedestal showing on dotted lines the inner wall structure thereof;

FIG. 7 is an opposite front view of the stackable pedestal;

FIG. 8 is a detailed sectional view taken on line 8—8 of FIG. 4 of the stackable pedestal;

DETAILED DESCRIPTION OF THE INVENTION

Figure 9:
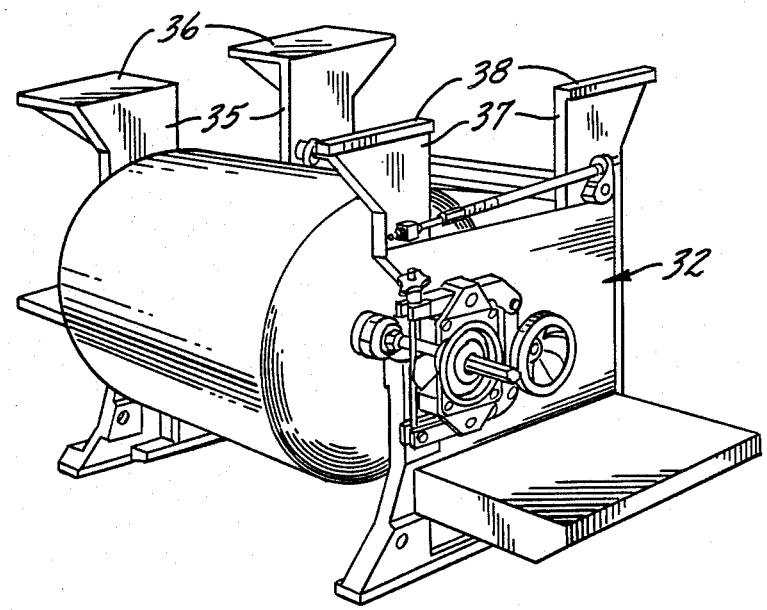
FIG. 9 is a perspective view of a rollstand modular unit.

FIG. 1 illustrates a pair of stacked modular frames 10 and 11, each of which is of the same construction and design and, therefore, each will bear similar identifying reference numbers. It should be understood that there is a rear drive side frame and a front operator side frame, identical to the frames 10 and 11 as shown, connected together to form the entire frame structure for the operating mechanisms.

Each frame 10 and 11 includes a standing wall 12 supported by a bottom wall 13 that includes a pair of depending end legs 14. As seen in FIG. 2, the bottom wall 13 as well as the legs 14 are formed by laterally extending flange members which together with a flange 15 form a top wall. Formed on one side of the standing wall 12 is a recess compartment 16. This recess compartment 16 will house the working mechanisms of the units and may be provided with a cover (not shown) so as to enclose such mechnisms as desired.

It should be noted that the legs 14 of the frames are substantially rectangular and extend through the entire depth of the recess compartment 16.

The top wall is formed to provide at each end a pedestal stand 18 of a size corresponding to the legs 14. Each stand 18 is formed to provide access opening 19.

The inner edges 20 of the pedestal stands 18 are joined to inwardly converging sections that terminate into a wall 21 which provides access to the mechanisms supported between the frames through the area above wall 21.

As seen in FIG. 1, the bottom frame 11 is positioned upon a bed plate 22 forming a complete base unit. The upper frame 10 has its legs 14 supported by a pedestal 23 that in turn is mounted upon the pedestal stands 18 of the bottom frame 11.

Referring to FIGS. 4 through 8, the pedestal 23 is cavity cast, so as to provide a solid rear wall 24, and side walls 25 and 26. The remaining side is open to provide an access 27. The bottom wall 29 of the pedestal 23 is provided with an access opening 30.

By this construction, the access opening 30 of the pedestal 23 will be in alignment with the access opening 19 of the stacked frame 11. This unrestricted passage through access opening 27, 30 and 19 permits access to the interior of the unit for repair and/or replacement of worn mechanisms in recess compartment 16.

Figure 10:
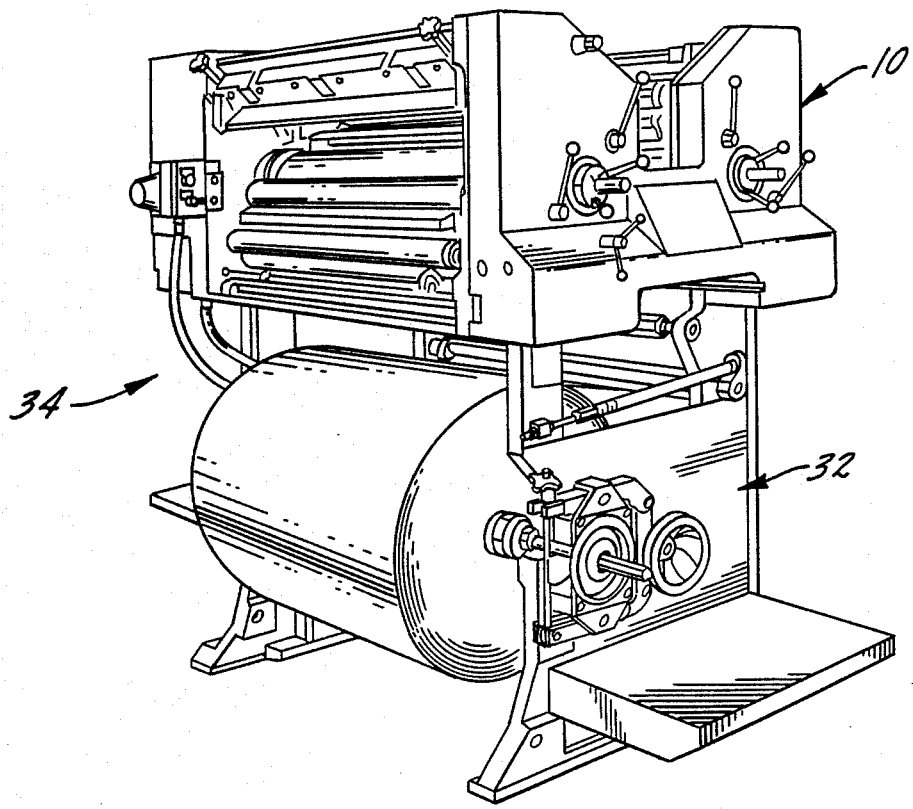
FIG. 10 is a perspective view of a floor line unit.

Referring to FIG. 9, there is shown an improved rollstand 32 having matching bolt hole patterns for accommodating the modular unit and mounting pedestals 23. As seen in FIG. 10, the rollstand 32 has mounted thereon a modular unit to comprise a free standing floor line unit 34.

As seen, the rollstand 32 includes upstanding corner posts 35 that terminate into flat pedestal stands 36. Certain other corner posts 37 provide base bars 38 for attachment to the stacked unit.

What I claim as new and novel and desire to protect by Letters Patent is:

1. A press unit formed of modular frames having a compartment for housing press working mechanisms including means for vertically stacking of said units comprising:

(a) modular side frames connected in spaced apart relation;

(b) each side frame having a rear wall, a bottom wall, and a top wall, said bottom and top walls formed by laterally extending flanges so as to define an open sided compartment for housing press working mechanisms;

(c) said top wall and said bottom wall providing at their opposite ends pedestal stands;

(d) said top wall having an access opening;

(e) a stacking pedestal having a bottom wall and a side wall, said stacking pedestal positioned between said pedestal stands provided by said top and bottom walls as said frames are vertically stacked; and (f) access means provided by said stacking pedestal in alignment with the access opening in said top wall permitting access to said compartment for housing press working mechanisms therethrough to the area between said side frames.

2. A press unit formed of modular frames as defined by claim 1 wherein said pedestal stands provided by said top wall and said bottom wall are rectangular in shape.

3. A press unit formed of modular frames as defined by claim 1 wherein said stacking pedestal comprises a hollow cube shaped member having dimensions equal to that of said pedestal stands provided by said top and bottom walls.

4. A press unit formed of modular frames as defined by claim 3 wherein said pedestal stands as provided by said top and bottom walls are generally rectangular in shape and have the same width as said hollow cube-like stacking pedestal so as to support the same thereon.

5. A press unit formed of modular frames as defined by claim 1 wherein said access means provided by said stacking pedestal are access openings formed in the side and bottom walls thereof.

6. A press unit formed of modular frames as defined by claim 5 wherein said pedestal stands are substantially rectangular in shape.

7. A press unit formed of modular frames as defined by claim 5 wherein said stacking pedestal comprises a hollow cube-shaped member having dimensions equal to said pedestal stands so as to be supported thereon.

* * * * *